United States Patent [19]

Hurwitz et al.

[11] Patent Number: 5,064,603
[45] Date of Patent: Nov. 12, 1991

[54] HYDROBALL STRING SENSING SYSTEM

[75] Inventors: Michael J. Hurwitz, Pittsburgh; Douglas E. Ekeroth, Delmont; David Squarer, Pittsburgh, all of Pa.

[73] Assignee: Westinghouse Electric Corp., Pittsburgh, Pa.

[21] Appl. No.: 397,824

[22] Filed: Aug. 24, 1989

[51] Int. Cl.$^5$ ............................................. G21C 17/00
[52] U.S. Cl. .................................. 376/246; 376/254; 73/861.05
[58] Field of Search ............................. 376/254, 246; 73/861.05

[56] References Cited

U.S. PATENT DOCUMENTS 3,845,311 10/1974 Fujii ..................................... 250/390
4,051,723 10/1977 Head et al. ....................... 73/861.05
4,927,593 5/1990 Impink, Jr. et al. ................. 376/254

Primary Examiner—Donald P. Walsh
Assistant Examiner—Meena Chelliah

[57] ABSTRACT

A hydroball string sensing system for a nuclear reactor that includes stainless tubes positioned to guide hydroball strings into and out of the nuclear reactor core. A sensor such as an ultrasonic transducer transmitter and receiver is positioned outside of the nuclear reactor core and adjacent to the tube. The presence of an object such a bullet member positioned at an end a hydroball string, or any one of the hydroballs interrupts the transmission of ultrasound from the transmitter to the receiver. Alternatively, if the bullet member and hydroballs include a ferritic material, either a Hall effect sensor or other magnetic field sensors such as a magnetic field rate of change sensor can be used to detect the location and position of a hydroball string. Placing two sensors along the tube with a known distance between the sensors enables the velocity of a hydroball string to be determined. This determined velocity can be used to control the flow rate of a fluid within the tube so as to control the velocity of the hydroball string.

20 Claims, 5 Drawing Sheets

HYDROBALL STRING SENSING SYSTEM

BACKGROUND OF THE INVENTION

This invention relates to a nuclear reactor sensing system; and more particularly to a hydroball string sensing system that determines the location and velocity of a hydroball string.

To control the operation of a nuclear reactor the neurron flux within the reactor core region is monitored. To monitor this neutron flux, numerous tubes are positioned within the core. These tubes house strings called hydroball strings that include stainless steel beads on a flexible stainless steel cable. Each of the stainless beads includes a material such as manganese that absorbs neutrons while the stainless steel bead is in the core region.

After the strings have been in the core for several minutes, the strings are removed from the core region and the decay time of the activated manganese in each bead is measured. This measurement indicates the neutron flux to which each bead was subjected while within the reactor core region. The hydroball strings are moved into and out of the reactor core region by pumping water through the tubes in the direction of desired hydroball string movement.

With this technique for approximating the neutron flux in a reactor core region, it is critical: (1) to know how long the hydroball string spends in the reactor core region, (2) to know how much time elapses between the string leaving the core region and the start of measuring the radiation emitted from each hydroball, and (3) to confirm the location of the hydroball string at various times as it is moved into and out of the reactor core region. Because the hydroball string is housed within a thick walled stainless steel tube that contains reactor core fluid at the same pressure as within the reactor core, it is difficult to achieve these critical objectives.

SUMMARY OF THE INVENTION

It is an object of the present invention to provide a hydroball string sensing system which can accurately determine the time spent by a hydroball string within a reactor core region.

It is another object of the present invention to provide a hydroball string sensing system capable of operating on tubes which are maintained at 600° F. or above.

It is a further object invention to provide a hydroball string sensing system which can accurately locate a hydroball string.

It is still another object of the present invention to provide a hydroball string sensing system that can accurately determine the amount of time that the radiation from a particular hydroball is sensed.

It is still a further object of the present invention to provide a hydroball string sensing system capable of detecting and controlling the velocity of a hydroball string within a tube.

To achieve the above and other objects, the present invention provides a hydroball string sensing system for a nuclear reactor having a core containing a fluid at a fluid pressure, the system comprises: a tube connectable to the nuclear reactor core so that the fluid can flow within the tube at a fluid pressure that is substantially the same as the fluid pressure of the nuclear reactor core; a hydroball string including a string member having objects positioned thereon with a specified spacing, the objects include a plurality of hydroballs and bullet members positioned at opposing ends of the string member; and a first sensor means positioned outside of a first segment of the tube, for sensing one of the objects being positioned within the first segment, and for providing a sensing signal responsive to the sensing of the first sensing means.

The present invention also provides a hydroball string sensing system for a nuclear reactor having a core containing a fluid at a fluid pressure, the system comprises: a tube connectable to the nuclear reactor so that the fluid can flow within the tube at a fluid pressure that is substantially the same as the fluid pressure of the nuclear reactor core; a hydroball string including—a string member having objects positioned therealong with a specified spacing, the objects including a plurality of hydroballs, and bullet members positioned at opposing ends of the string member; first ultrasonic transducer sensor means, positioned outside a first segment of the tube, for sensing one of the objects being positioned within the first segment, and for providing a sensing signal responsive to the sensing of the first sensor means; second ultrasonic transducer sensor means, positioned outside a second segment of the tube being spaced a given distance along the tube from the first segment, for sensing one of the objects being positioned within the second segment, and for providing a sensing signal responsive to the sensing of said second sensor means; timing means for determining an amount of time between the first sensor means sensing the one of the objects within the first segment and the first sensor means sensing another one of the objects within the first segment; means for determining a velocity of the objects based upon the specified spacing and the determined amount of time; means for adjusting the rate of the fluid flow so as to make the determined velocity substantially equal to a desired velocity; and detector means, positioned outside of the tube and between the first and second segments for counting gamma rays emitted from one of the objects while the object is between the first and second sensor means.

DESCRIPTION OF THE PREFERRED EMBODIMENTS

Figure 1:
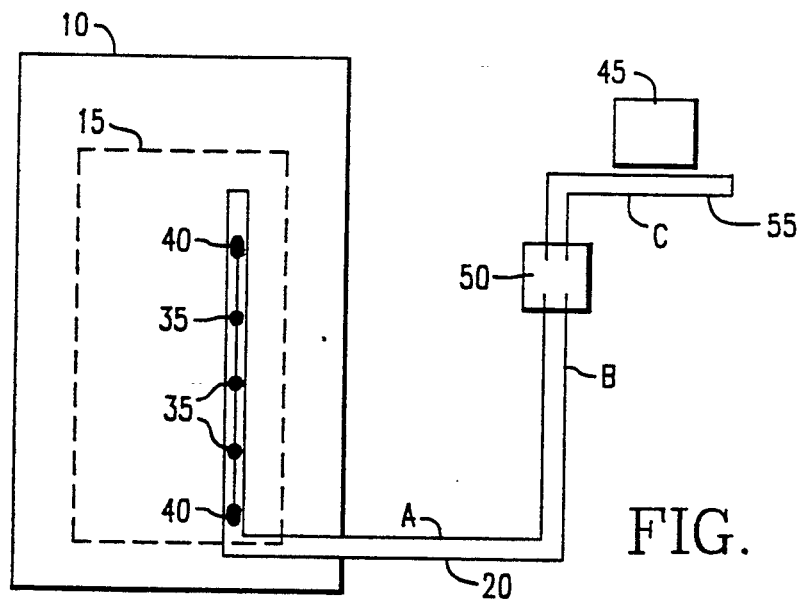
FIG. 1 is a schematic block diagram of a hydroball string sensing system embodying the present invention.

FIG. 1 is a schematic block diagram of a hydroball string sensing system embodying the present invention. In FIG. 1, a nuclear reactor vessel 10 includes a core region 15. The nuclear reactor vessel 10 contains a pressurized, high temperature fluid such as water. The fluid pressure within the core region 15 is in the range of, for example, 1,200 psi to 2,000 psi. The core region 15 has positioned therein fuel rods and a number of stainless steel tubes such as a tube 20 shown in FIG. 1. Each of the tubes 20 is connected to the nuclear reactor vessel 10 and contains the pressurized water at substantially the same pressure as within the core region 15. Basically, each of the tubes 20 functions as an extension of the nuclear reactor vessel 10. Because the tubes 20 are subjected to the same high temperature (e.g., 600° F.), high pressure water that exists within the core region 15, the tubes 20 are structure of thick stainless steel walls (e.g., 0.05 inch).

The hydroball string 25 comprises a string member 30 with objects including hydroballs 35 and bullet members 40. The hydroballs 35 are positioned along the string member 30 with a specified spacing between each hydroball 35. As shown in FIG. 1, the bullet members 40 are positioned at opposing ends of the string member 30.

The hydroballs 35 can comprise, for example, 304 stainless steel with 2% manganese or 18-8 austenitic stainless steel. The bullet members 40 can comprise a ferritic stainless steel such as 17-4 PH. The structure and operation of a hydroball string is known to those skilled in the art and discussed in, for example, copending U.S. patent application Ser. No. 07/042,183 and entitled Hydro-Ball In-Core Instrumentation System and Method of Operation which is assigned to the same assignee as this application. Briefly, the hydroball string 25 is moved within the stainless steel tube 20 by pumping water into or out of the reactor vessel 10, depending upon whether it is desired to move the hydroball string 25 into or out of the reactor vessel 10.

Sensors (described below) at location A sense the presence of the objects on the hydroball string 25, such as bullet members 40. This sensing indicates whether the hydroball string 25 has entered into or exited from the nuclear reactor 10. With this information, the amount of time that the hydroball string 25 spends within the nuclear reactor 10 can be measured together with the amount of time that elapses after the hydroball string 25 leaves the reactor vessel 10 and before the string 25 reaches a location C and counter station 45. In practice, there is only one counter station for the many stainless steel tubes 20. Consequently, a multiport valve 50 determines which of the stainless steel tubes 20, and therefore which hydroball string 25 housed therein is connected to a tube 55 located adjacent the counter station 45.

Figure 2:
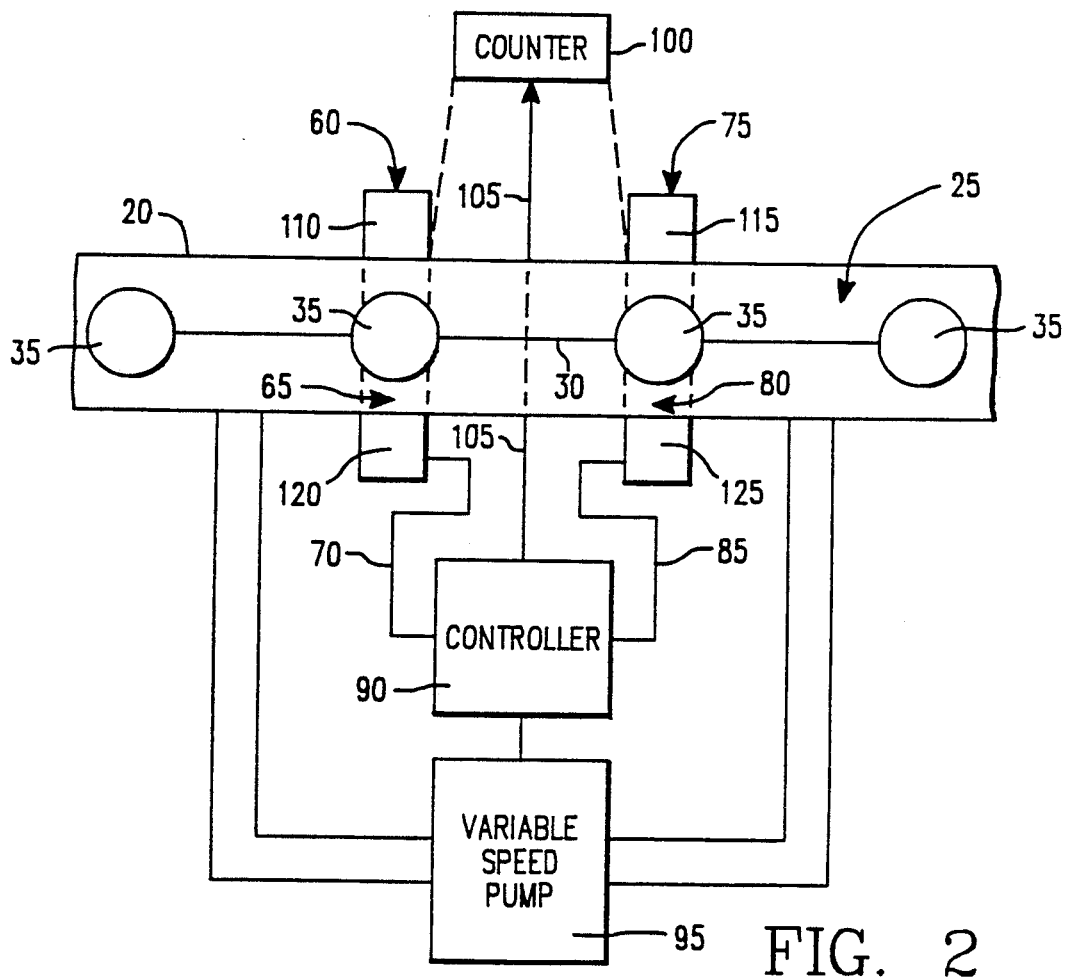
FIG. 2 is a schematic block diagram of a counter station portion of the FIG. 1 system.

FIG. 2 is a schematic block diagram of the counter station 45 shown in FIG. 1. In FIG. 2, a first sensor 60 is positioned outside a first segment 65 of the tube 20. The first sensor 60 (described in detail below) senses objects, such as a hydroball 35 being within the first segment 65. The first sensor 60 provides a first sensing signal on signal line 70. The first sensing signal is responsive to the first sensor 60 sensing an object, such as hydroball 35, being within the first segment 65. In a manner similar to the first sensor 60, a second sensor 75 is positioned outside a second segment 80 of the tube 20 that is spaced a given distance along the tube 20 from the first sensor 60. The second sensor 75 provides a second sensing signal on signal line 85 that is responsive to the second sensor sensing an object such as hydroball 35 being within the second segment 80. The details of the first and second sensors (60, 75) are discussed below. Typically, the spacing between the first and second sensors (60, 75) is approximately ½ inch, and the spacing between the hydroballs 35 is approximately 2 inches. These particular dimensions are not required, but merely presented as examples.

As shown in FIG. 2, the first and second signal lines (70, 85) are connected to a controller 90. The controller 90 drives a variable speed pump 95. The controller 90 also determines the amount of time elapsing between the first sensor 60 sensing a first hydroball 35 being within the first segment 65, and the first sensor 60 sensing an adjacent hydroball 35 being within the first segment. Since the spacing between adjacent hydroballs 35 is known, the average velocity of the hydroball string 25 is calculated by controller 90 using the determined elapsed time and the known spacing between hydroballs 35. If the velocity determined by the controller 90 is less than a desired velocity, then the controller 90 increases the speed of the variable speed pump 95. This increases the flow of fluid within tube 20; thus, increasing the velocity of the hydroball string 25. Alternatively, if the velocity determined by the controller 90 is larger than the desired velocity, then the controller 90 decreases the speed of the variable speed pump 95. This reduces the flow rate of fluid within the tube 20; thus, reducing the velocity of the hydroball string 25 within the tube 20.

In FIG. 2, reference numeral 100 identifies a gamma ray scintillation counter. The structure and operation of such a counter is well known to those skilled in the art and therefore is not discussed here. The counter 100 detects the gamma ray radiation emitted from one of the hydroballs 35 during the time that the hydroball 35 is between the first and second sensors (60, 75). The time during which the counter 100 operates is controlled by controller 90. For example, when the first sensor 60 indicates, on signal line 70, that a hydroball 35 is in the first segment, the controller 90 initiates counting by the counter 100 via signal line 105. When the controller 90 determines that this same hydroball 35 is within the second segment 80, via signal line 85, the controller 90 stops the counting of the counter 100 via signal line 105. Thus, the count developed by counter 100 indicates the amount of radiation emitted from the hydroball 35 during the time that the hydroball 35 is between the first and second sensors (60, 75).

In a preferred embodiment of the present invention, the first and second sensors (60, 75) comprises ultrasonic transducers. Referring to FIG. 2, ultrasonic transducer transmitters 110 and 115 respectively transmit ultrasound into the first segment 65 and the second segment 80. Ultrasonic transducer receives 120 and 125 respectively receive ultrasound passing through the first segment 65 and the second segment 85. Basically, when a hydroball 35 is in, for example, the first segment, the amount of ultrasound received by ultrasonic transducer receiver 120 is substantially less than that received when there is no hydroball in the segment. Thus, a signal provided by the ultrasonic transducer receiver 120 varies in dependence upon the presence or absence of a hydroball 35 from the first segment 65. The ultrasonic transducers 120, 125 operate in the same way.

Figure 3:
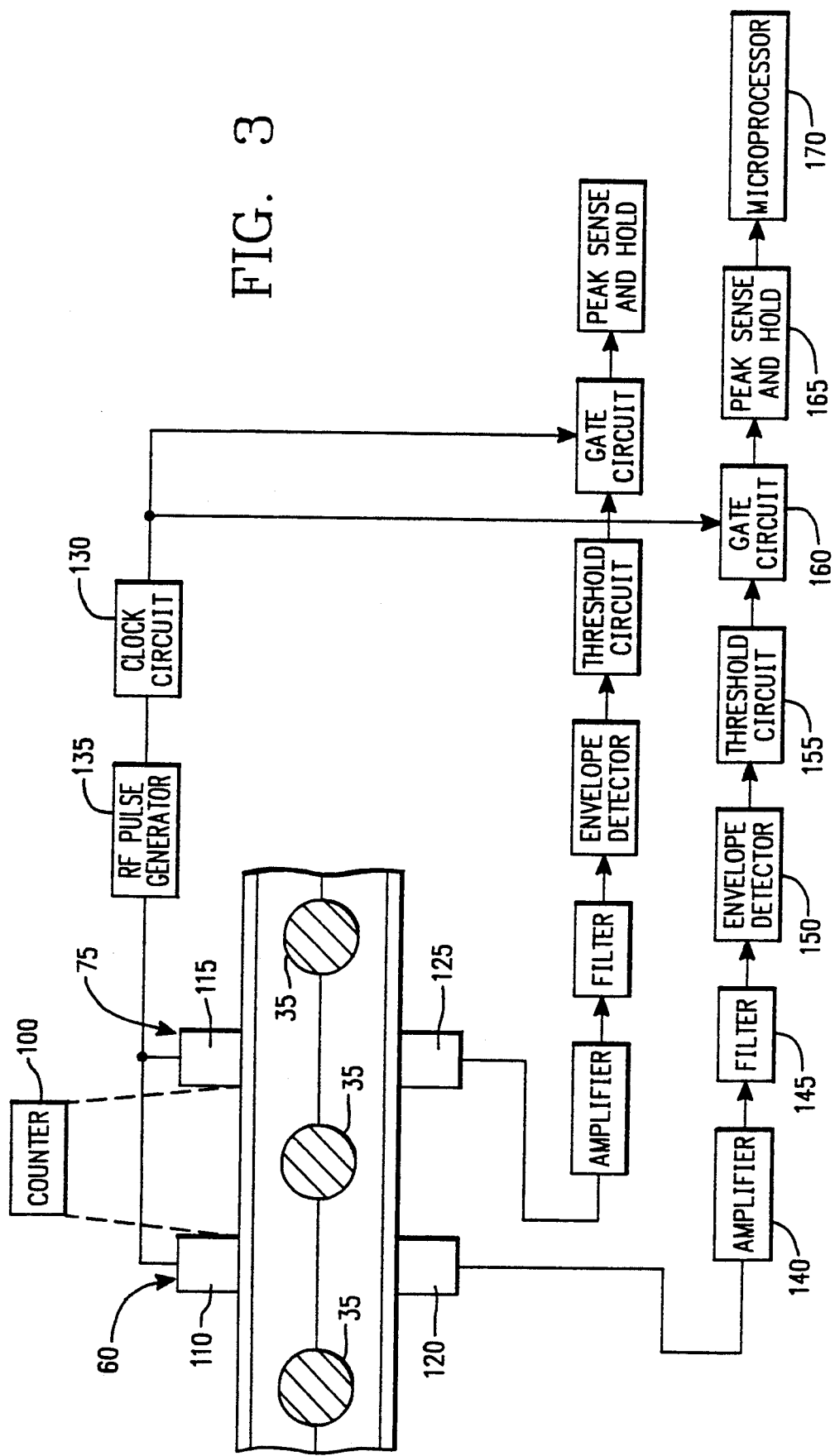
FIG. 3 is a schematic block diagram of a signal processing portion of the FIG. 1 system.

FIG. 3 is a schematic block diagram of a signal processing portion of the FIG. 1 system that is included in the controller 90. In FIG. 3, a clock circuit 130 controls an RF pulse generator 135 so as to gate RF pulses so as to provide bursts of RF pulses to the first and second transducers (60, 75). In a preferred embodiment the clock pulses occur at, for example, point 0.01 seconds, and the RF frequency is 5 Mhz. This frequency and pulse timing is only one example and used here only to discuss an embodiment of the present invention. Typically, the diameter of the transducer should a fraction of the diameter of the tube, and the length of the transducer along the tube 20 should be on the order of the size of a hydroball 35 or less in order to accurately sense the location of a hydroball.

Each of the ultrasonic transducer receivers (120, 125) is connected to signal processing and gating circuitry within controller 90. The processing and gating circuitry for each of the ultrasonic transducer receivers (120, 125) is the same, and therefore, only circuitry connected to ultrasonic transducer receiver 120 is discussed below.

The ultrasonic transducer receiver 120 converts the received ultrasound into electrical pulses. Typically, such electrical pulses have an amplitude of less than 1 mv. If a hydroball 35 is interposed between the ultrasonic transducer transmitter 110 and the ultrasonic transducer receiver 120, then the pulses provided by the ultrasonic transducer receiver 120 are much smaller than the 1 mv.

Figure 4:
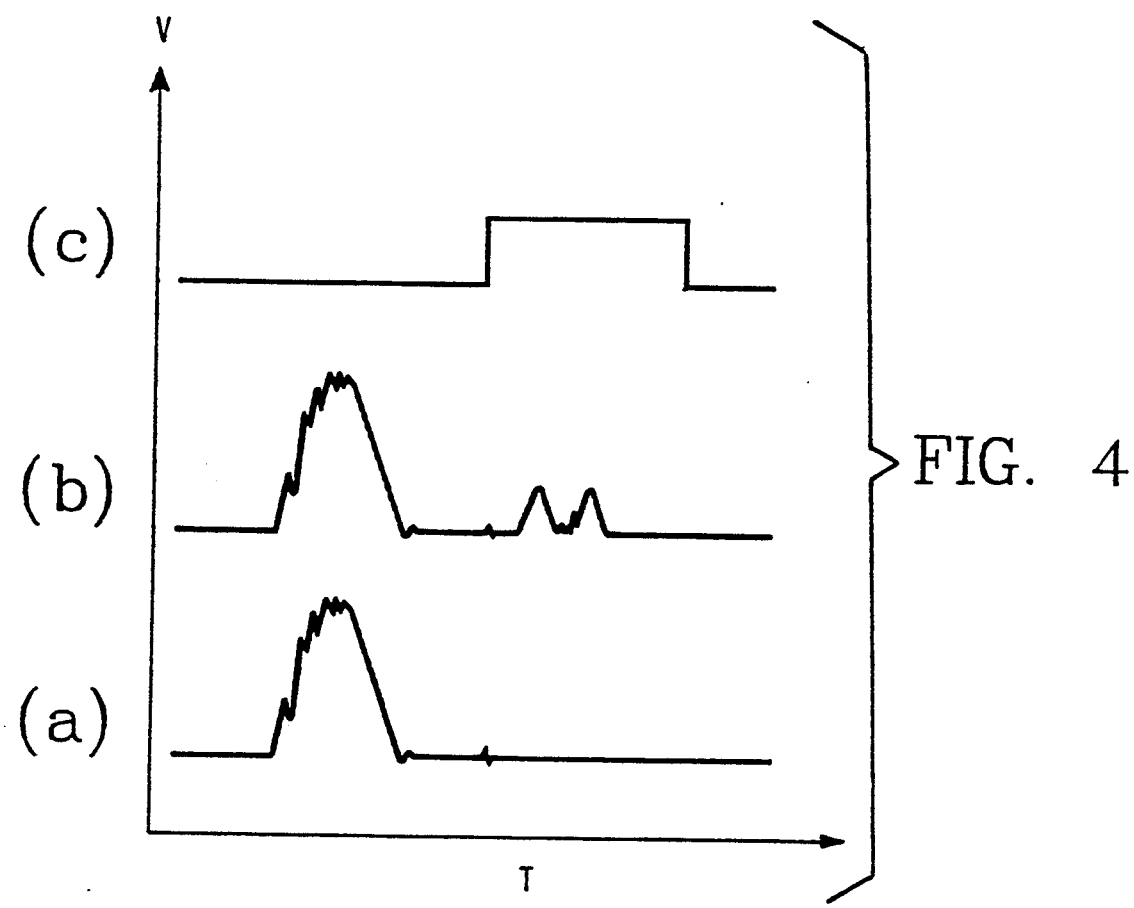
FIG. 4 is a signal appearing within the FIG. 3 portion of the FIG. 1 system.

The pulses provided by ultrasonic transducer receiver 120 are processed by a typical ultrasonic signal processing system. The signal processing system includes an amplifier 140 which amplifies the pulses by 30 to 50 db. A filter 145 filters the 5 Mhz pulses, and an envelope detector 150 converts a bipolar train of 5 Mhz pulses to an envelope. For example, the envelope detector can comprise a simple rectifying and filtering circuit. The output of the detector 150 is applied to a threshold circuit 155 such as a Schmitt trigger. This provides some noise immunity, wave shaping and a signal as shown in FIG. 4. In FIG. 4, the large pulses on the lefthand side of the waveform (b) and (c) represent the ultrasound being transmitted by, for example, ultrasonic transducer transmitter 110. In waveform (b) two smaller pulses represent ultrasound being received by the ultrasonic transducer receiver 120. The absence of the two smaller pulses in waveform (c), indicates that a hydroball 35 is positioned between the ultrasonic transducer transmitter 110 and the ultrasonic transducer receiver 120.

The clock circuit 130 also drives a gate circuit 160. The clock signal, shown in waveform (a) of FIG. 4, ensures that only the signal representing the ultrasound received by ultrasonic transducer receiver 120 is presented to a peak sense and hold circuit 165. The peak sense and hold circuit 165 detects the peak of the pulses shown in waveform (b) of FIG. 4 that occur during the clock signal, waveform (a). A microprocessor 170 detects the output of the peak sense and hold circuit 165, and when a pulse is sensed at the output of peak sense and hold circuit 165, the microprocessor identifies that there is no hydroball 35 between the ultrasonic transducer transmitter 110 and the ultrasonic transducer receiver 120.

Figure 5A:
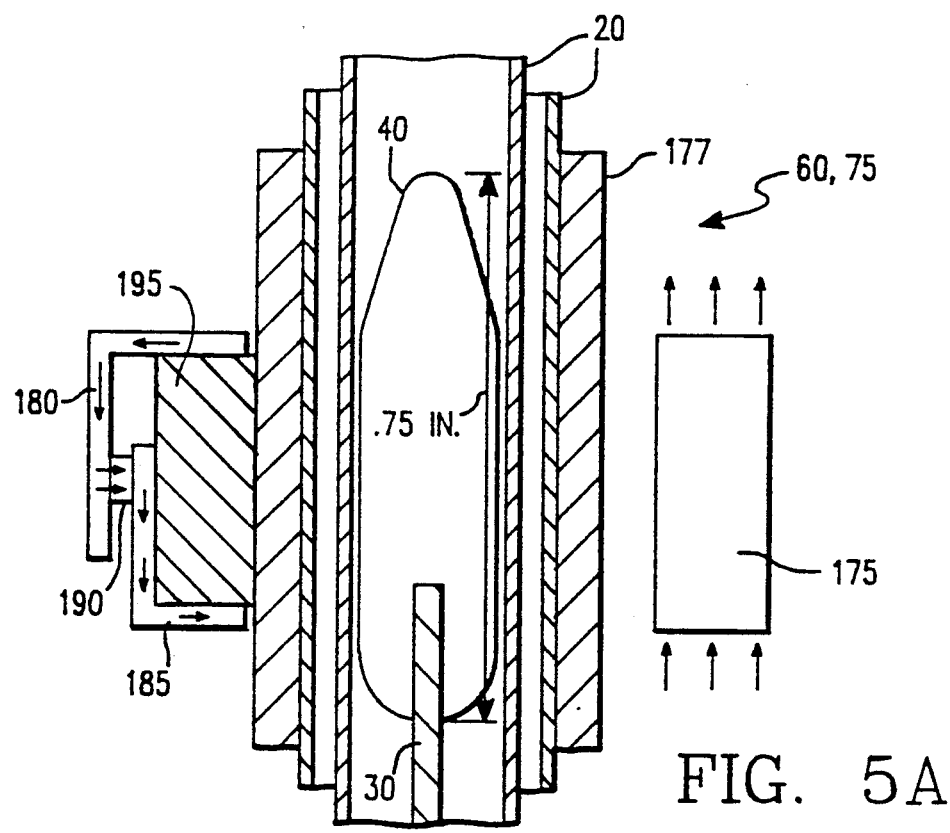
FIG. 5A is a partial cross-sectional view of a sensor usable in the FIG. 1 system.

FIG. 5A is a partial cross-sectional view of an alternative embodiment of the first and second sensors (60, 75). In FIG. 5A, a magnet 175 is attached to a ceramic fiber insulation 177 positioned about a double walled stainless steel tube 20. It will be recognized that it is not necessary to the present invention that a double walled tube be used. Pole pieces (180, 185) are positioned adjacent the ceramic fiber insulation 177 and located opposite the magnet 175. The pole pieces 180 and 185 guide a portion of the magnetic field provided by the magnet 175. A Hall effect transducer 190 is positioned between the pole pieces 180 and 185 to sense the magnetic field guided by the pole pieces 180 and 185.

Figure 5B:
FIG. 5B is a graph illustrating the waveform provided by the FIG. 5A sensor.

FIG. 5B is a graph illustrating a waveform provided by the Hall effect transducer 190 shown in FIG. 5A when a bullet member disturbs the magnetic field guided by the pole pieces 180 and 185. A ferritic object such as the bullet member 40 disturbs the magnetic field provided by the magnet 175. Essentially, the bullet member 40 shunts a significant portion of the magnetic field guided by the pole pieces 180, 185. Typically, the hall effect transducer 190 provides approximately 60 mv change in output when a bullet member 40 passes the sensor with about 1.1 inches between the pole pieces (180, 185) and the magnet 175. It will be recognized that larger signals can be obtained as the gap between the pole pieces (180, 185) and magnet 175 is reduced. As will be appreciated by those skilled in the art, when using the sensor shown in FIG. 5A, the filter 145 and the envelope detector 150 shown in FIG. 3 are not needed.

Figure 6A:
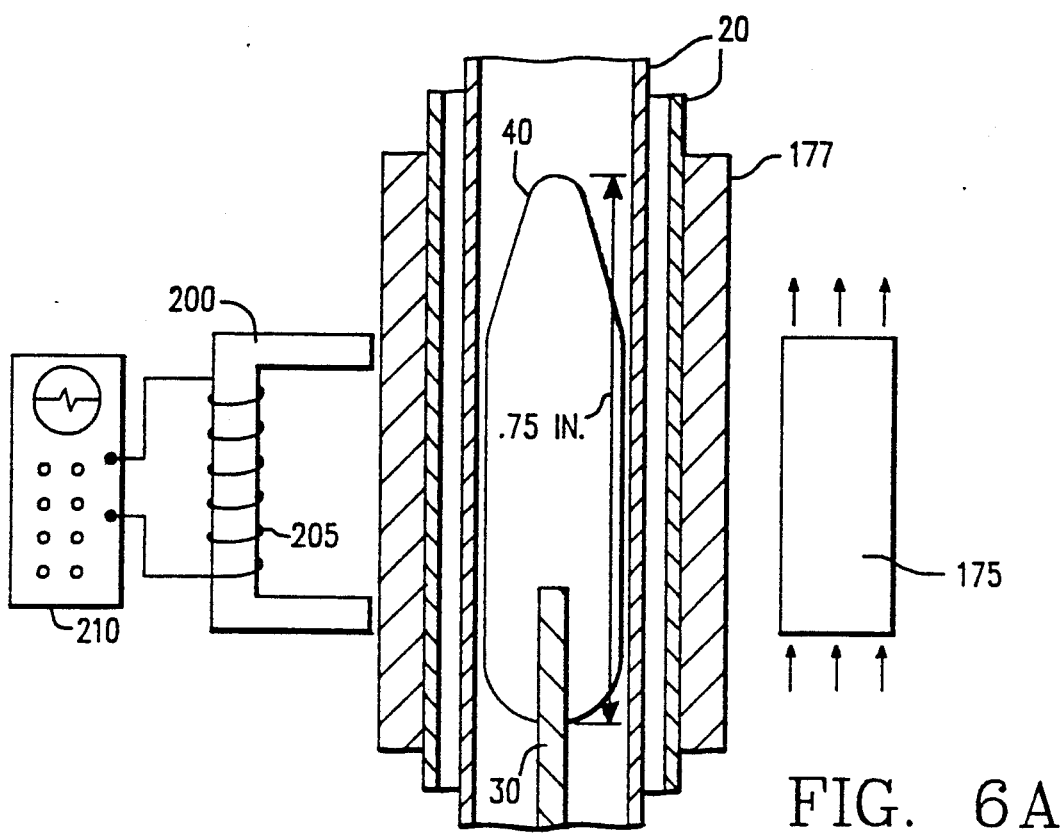
FIG. 6A is a partial cross-sectional view of a sensor usable in the FIG. 1 system.

FIG. 6A is a partial cross-sectional view of an alternative embodiment of the first and second sensors (60, 75). The sensor shown in FIG. 6A detects a rate of change of a magnetic field. In FIG. 4, a magnetically permeable or highly magnetically permeable material pole piece 200 guides a portion of the magnetic field provided by the magnet 175. A sense coil 205 is wound about the steel pole piece 200. The sense coil 205 senses the change in magnetic flux passing through the steel pole piece 200. The output of the sensed coil 205 can be applied to, for example, the amplifier 140 shown in FIG. 3, or can be displayed on a display device such as oscilloscope 210.

Figure 6B:
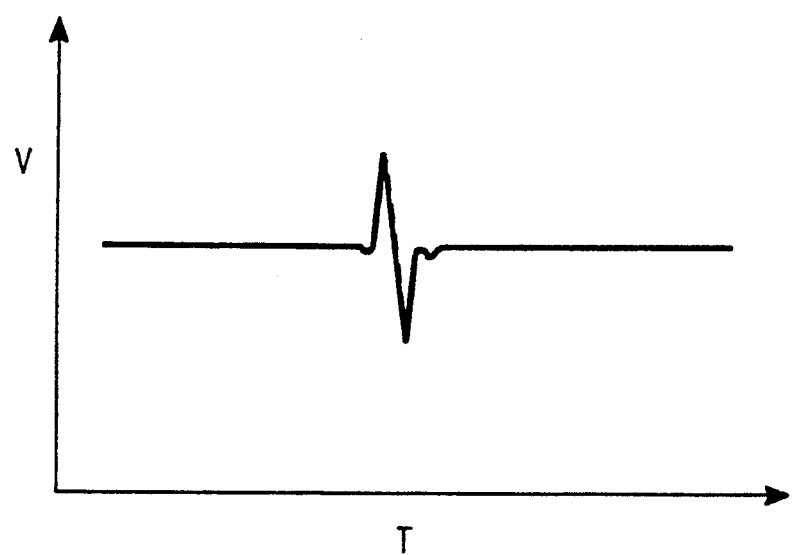
FIG. 6B is a graph illustrating the waveform provided by the FIG. 6A sensor.

FIG. 6B illustrates a waveform of a signal provided by the sense coil 205 when a ferritic object such as a bullet member 40 passes through the position shown in FIG. 6A. When using a rate of change sensor such as shown in FIG. 4, it is desirable to detect a zero crossing to accurately identify the position of an object such as the bullet member 40. Thus, the sense and hold circuit of FIG. 3 would be replaced by a zero crossing detection circuit and there is no need for the envelope detector 150.

While the present invention has been described with respect to a specific embodiments, these embodiments are not intended to limit the scope of the present invention which is instead defined by the following claims.

We claim:

1. A hydroball string sensing system for a nuclear reactor having a core containing a fluid at a fluid pressure, said system comprising:

a tube connectable to the nuclear reactor so that the fluid can flow within said tube at a fluid pressure that is substantially the same as the fluid pressure of the nuclear reactor core;

a hydroball string including—
 a string member having objects positioned therealong with a specified spacing, said object including
 a plurality of hydroballs, and
 bullet members positioned at opposing ends of said string member;

first sensor means, positioned outside a first segment of said tube, for sensing one of said objects being positioned within said first segment, and for providing a sensing signal responsive to said sensing of said first sensing means.

2. A system according to claim 1, further comprising:

second sensor means, positioned outside a second segment of said tube being spaced a given distance along said tube from said first segment, for sensing one of said objects being positioned within said second segment, and for providing a sensing signal responsive to said sensing of said second sensing means.

3. A system according to claim 2, further comprising:
timing means for determining an amount of time between said first sensor means sensing said one of said objects within said first segment and said first sensor means sensing another one of said objects within said first segment.

4. A system according to claim 3, wherein the fluid within said tube flows at a rate, and said system further comprises:
means for determining a velocity of said objects based upon said specified spacing and said determined amount of time; and
means for adjusting the rate of the fluid flow so as to make said determined velocity substantially equal to a desired velocity.

5. A system according to claim 4, wherein each of said first and second sensor means comprises:
first ultrasonic transducer means for transmitting ultrasound into said tube; and
second ultrasonic transducer means for receiving ultrasound having passed through said tube and for providing said sensing signal in accordance with said received ultrasound.

6. A system according to claim 4, wherein each of said first and second sensor means comprises:
a magnet having a magnetic field thereabout an being positioned adjacent said tube;
pole pieces positioned to guide a portion of the magnetic field; and
magnetic sensor means, positioned between two of said pole pieces, for sensing said portion of said magnetic field guided by said pole pieces and for providing said sensing signal in accordance with said sensed magnetic field.

7. A system according to claim 4, wherein each of said first and second sensor means comprises:
a magnet having a magnetic field thereabout and being positioned adjacent said tube;
a pole piece positioned to guide at least a portion of the magnetic field; and
coil means positioned about said pole piece for sensing the magnetic field guided by said pole piece and for providing said sensing signal in accordance with said sensed magnetic field.

8. A system according to claim 5, further comprising:
RF pulse generating means for driving said first ultrasonic transducer means of each of said first and second sensor means in accordance with a clock signal;
a clock circuit connected to provide said clock signal; and
signal processing means for amplifying and filtering said sensing signal and for providing said amplified and filtered sensing signal as an output.

9. A system according to claim 8, wherein each of said first and second sensor means further comprises:
gate means, operatively connected between said timing means and said signal processing means, for providing said amplified and filtered sensing signal in accordance with said clock signal.

10. A system according to claim 9, wherein said hydroballs comprise stainless steel.

11. A system according to claim 10, wherein said bullet members comprise stainless steel.

12. A system according to claim 5, further comprising:
detector means for detecting radiation emitted from one of said objects during a time while said one of said objects is between said first and second sensor means.

13. A system according to claim 12, wherein said detector means includes means for counting gamma rays emitted from said one of said objects.

14. A system according to claim 6, further comprising:
detector means for detecting radiation emitted from one of said objects during a time while said one of said objects is between said first and second sensor means.

15. A system according to claim 7, further comprising:
detector means for detecting radiation emitted from one of said objects during a time while said one of said objects is between said first and second sensor means.

16. A system according to claim 6, wherein said hydroballs comprise ferritic stainless steel.

17. A system according to claim 16, wherein said bullet members comprise ferritic stainless steel.

18. A system according to claim 7, wherein said hydroballs comprise ferritic stainless steel.

19. A system according to claim 18, wherein said bullet members comprise ferritic stainless steel.

20. A hydroball string sensing system for a nuclear reactor having a core containing a fluid at a fluid pressure, comprising:
a tube connectable to the nuclear reactor so that the fluid can flow within said tube at a fluid pressure that is substantially the same as the fluid pressure of the nuclear reactor core;
a hydroball string including—
a string member having objects positioned therealong with a specified spacing, said object including
a plurality of hydroballs, and
bullet members positioned at opposing ends of said string member; first ultrasonic transducer sensor means, positioned outside a first segment of said tube, for sensing one of said objects being positioned within said first segment, and for providing a sensing signal responsive to said sensing of said first sensor means;
second ultrasonic transducer sensor means, positioned outside a second segment of said tube being spaced a given distance along said tube from said first segment, for sensing one of said objects being positioned within said second segment, and for providing a sensing signal responsive to said sensing of said second sensor means;
timing means for determining an amount of time between said first sensor means sensing said one of said objects within said first segment and said first sensor means sensing another one of said objects within said first segment;
means for determining a velocity of said objects based upon said specified spacing and said determined amount of time;
means for adjusting the rate of the fluid flow so as to make said determined velocity substantially equal to a desired velocity; and
detector means, positioned outside of said tube and between said first and second segments for counting gamma rays emitted from one of said objects while said one of said objects is between said first and second sensor means.

* * * * *